United States Patent
Mitchell et al.

(10) Patent No.: US 10,590,224 B2
(45) Date of Patent: Mar. 17, 2020

(54) FLUORINATED BLOCK COPOLYMERS

(71) Applicant: 3M INNOVATIVE PROPERTIES COMPANY, St. Paul, MN (US)

(72) Inventors: Michael H. Mitchell, Woodbury, MN (US); Denis Duchesne, Woodbury, MN (US); Tatsuo Fukushi, Woodbury, MN (US); Werner M. A. Grootaert, Oakdale, MN (US); Larry A. Last, Moulton, AL (US); Peter J. Scott, Woodbury, MN (US); Karl D. Weilandt, Meerbusch (DE)

(73) Assignee: 3M Innovative Properties Company, St. Paul, MN (US)

( * ) Notice: Subject to any disclaimer, the term of this patent is extended or adjusted under 35 U.S.C. 154(b) by 135 days.

(21) Appl. No.: 15/742,202

(22) PCT Filed: Jul. 11, 2016

(86) PCT No.: PCT/US2016/041714
§ 371 (c)(1),
(2) Date: Jan. 5, 2018

(87) PCT Pub. No.: WO2017/011379
PCT Pub. Date: Jan. 19, 2017

(65) Prior Publication Data
US 2018/0194888 A1    Jul. 12, 2018

Related U.S. Application Data

(60) Provisional application No. 62/191,553, filed on Jul. 13, 2015.

(51) Int. Cl.
| C08F 299/02 | (2006.01) |
| C08F 293/00 | (2006.01) |
| C08F 16/24 | (2006.01) |
| C08F 214/22 | (2006.01) |
| C08F 214/26 | (2006.01) |
| C08F 214/28 | (2006.01) |
| C08K 5/14 | (2006.01) |

(52) U.S. Cl.
CPC .......... *C08F 299/022* (2013.01); *C08F 16/24* (2013.01); *C08F 214/222* (2013.01); *C08F 214/262* (2013.01); *C08F 214/282* (2013.01); *C08F 293/005* (2013.01); *C08K 5/14* (2013.01); *C08F 2438/01* (2013.01)

(58) Field of Classification Search
CPC .. C08F 299/022; C08F 293/005; C08F 16/24; C08F 214/222; C08F 214/262; C08F 214/282; C08F 2438/01; C08K 5/14
USPC ...................................................... 524/546
See application file for complete search history.

(56) References Cited

U.S. PATENT DOCUMENTS

| | | |
|---|---|---|
| 3,929,934 A | 12/1975 | Moore |
| 4,158,678 A | 6/1979 | Tatemoto |
| 4,603,175 A | 7/1986 | Kawachi |
| 5,225,504 A | 7/1993 | Tatsu |
| 5,585,449 A | 12/1996 | Arcella |
| 5,605,971 A | 2/1997 | Arcella |
| 5,612,419 A | 3/1997 | Arcella |
| 5,717,036 A | 2/1998 | Saito |
| 5,741,855 A | 4/1998 | Kaduk |
| 6,107,363 A | 8/2000 | Gayer |
| 6,207,758 B1 | 3/2001 | Brinati |
| 6,310,141 B1 | 10/2001 | Chen |
| 6,323,283 B1 | 11/2001 | Apostolo |
| 6,503,986 B1 | 1/2003 | Tanaka |
| 6,512,063 B2 | 1/2003 | Tang |
| 6,646,077 B1 | 11/2003 | Lyons |
| 6,710,132 B2 | 3/2004 | Apostolo |
| 6,822,050 B2 | 11/2004 | Albano |
| 6,844,036 B2 | 1/2005 | Apostolo |
| 7,348,366 B2 | 3/2008 | Walker |
| 7,521,513 B2 | 4/2009 | Tang |
| 7,671,112 B2 | 3/2010 | Hintzer |
| 2004/0254268 A1 | 12/2004 | Cernohous |
| 2008/0116603 A1 | 5/2008 | Grootaert |
| 2011/0112265 A1 | 5/2011 | Washino |
| 2012/0108756 A1 | 5/2012 | Komatsu |
| 2013/0109797 A1 | 5/2013 | Fantoni |
| 2015/0073111 A1 | 3/2015 | Hung |
| 2015/0094428 A1 | 4/2015 | Thenappan |

(Continued)

FOREIGN PATENT DOCUMENTS

| CA | 2037234 | 9/1991 | |
|---|---|---|---|
| EP | 0661312 | 7/1995 | |
| EP | 0661312 A1 * | 7/1995 | ............ C08F 293/00 |

(Continued)

OTHER PUBLICATIONS

Peyser, "Polymer handbook", pp. 209-258 (1989).
Salamone. "Polymeric materials encyclopedia", CRC Press, New York 1996, vol. 1, pp. 432-440.
Sorenson, "Preperative methods of polymer chemistry", Interscience, New York, 1968, pp. 209-.
International Search report for PCT International application No. PCT/US2016/041714 dated Oct. 7, 2016, 4 pages.
International Search report for PCT International application No. PCT/US2018/013553 dated Apr. 3, 2018, 5 pages.

(Continued)

*Primary Examiner* — Michael Bernshteyn
(74) *Attorney, Agent, or Firm* — Julie Lapos-Kuchar

(57) ABSTRACT

Described herein is a millable fluorinated block copolymer having at least one A block and at least one B block, wherein the A block is a semi-crystalline segment comprising repeating divalent monomeric units derived from TFE, HFP and VDF; and the B block is a segment comprising repeating dilvalent monomeric units derived from HFP and VDF; and wherein the millable fluorinated block copolymer has a modulus of 0.1 to 2.5 MPa at 100° C.

20 Claims, No Drawings

(56) References Cited

U.S. PATENT DOCUMENTS

2016/0369021 A1    12/2016   Solvay

FOREIGN PATENT DOCUMENTS

| | | |
|---|---|---|
| EP | 0 924 257 | 6/1999 |
| EP | 0967248 | 12/1999 |
| EP | 1262517 | 12/2002 |
| EP | 1262518 | 12/2002 |
| EP | 1 304 341 | 4/2003 |
| JP | 63-059405 | 3/1988 |
| JP | 10-130341 | 5/1998 |
| JP | 2009-227780 | 10/2009 |
| JP | 2009-256658 | 11/2009 |
| JP | 2011-241299 | 12/2011 |
| JP | 2014-070206 | 4/2014 |
| WO | WO 1996-017877 | 6/1996 |
| WO | WO 1997-047683 | 12/1997 |
| WO | WO-9747683 A1 * | 12/1997 ............. C08L 23/08 |
| WO | WO 2000-004091 | 1/2000 |
| WO | WO 2009-119723 | 10/2009 |
| WO | WO-2009119723 A1 * | 10/2009 ............ C08F 259/08 |
| WO | WO 2011-007862 | 1/2011 |
| WO | WO 2012-007374 | 1/2012 |
| WO | WO 2014-030586 | 2/2014 |
| WO | WO 2014/062469 | 4/2014 |
| WO | WO 2015-047749 | 4/2015 |
| WO | WO 2016/109339 | 7/2016 |
| WO | WO 2016/137851 | 9/2016 |
| WO | WO 2017/011379 | 1/2017 |

OTHER PUBLICATIONS

International Search report for PCT International application No. PCT/US2018/013496 dated Apr. 27, 2018, 4 pages.
International Search report for PCT International application No. PCT/US2018/013547 dated May 21, 2018, 4 pages.

* cited by examiner

FLUORINATED BLOCK COPOLYMERS

CROSS REFERENCE TO RELATED APPLICATIONS

This application is a national stage filing under 35 U.S.C. 371 of PCT/US2016/041714, filed Jul. 11, 2016, which claims the benefit of U.S. Application No. 62/191,553, filed Jul. 13, 2015, the disclosure of which is incorporated by reference in its/their entirety herein.

TECHNICAL FIELD

Fluorinated block copolymers that can be processed as an elastomer are described.

BACKGROUND

There has been an increasing need for higher temperature elastomers that perform adequately at for example, temperatures of 200° C. to 330° C. Because of the higher bond energy of the C—F bond, perfluoroelastomers (fully fluorinated molecules) traditionally have been used at these extreme temperature conditions. However the cost of perfluoroelastomers can make them undesirable or prohibitive for certain applications and markets.

Partially fluorinated elastomers are typically less expensive than perfluorinated elastomers and because they comprise some fluorine, they can perform adequately in some of the same extreme conditions as the perfluorinated elastomers, e.g., chemical resistance, etc. However, one area where partially fluorinated elastomers do not perform as well as their perfluorinated counterparts is in high temperature sealing applications that require good compression set resistance at elevated temperatures (e.g higher than 200° C.).

SUMMARY

There is a desire to identify a fluoropolymer material, which has improved properties at elevated temperatures. There is also a desire for the material to be processed as an elastomer, for example, by a two-roll mill or an internal mixer.

In one aspect, a curable composition is provided comprising a fluorinated block copolymer, wherein the fluorinated block copolymer comprises at least one A block and at least one B block, wherein the A block is a semi-crystalline segment comprising repeating divalent monomeric units derived from TFE, HFP and VDF; and wherein the B block is a segment comprising repeating dilvalent monomeric units derived from HFP and VDF; and wherein the fluorinated block copolymer has a modulus of 0.1 to 2.5 MPa at 100° C.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term

"a", "an", and "the" are used interchangeably and mean one or more; and

"and/or" is used to indicate one or both stated cases may occur, for example A and/or B includes, (A and B) and (A or B);

"backbone" refers to the main continuous chain of the polymer;

"copolymer" refers to a polymeric material comprising at least two different interpolymerized monomers (i.e., the monomers do not have the same chemical structure) and include terpolymers (three different monomers), tetrapolymers (four different monomers), etc.;

"crosslinking" refers to connecting two pre-formed polymer chains using chemical bonds or chemical groups;

"cure site" refers to functional groups, which may participate in crosslinking;

"glass transition temperature" or "$T_g$" refers to the temperature at which a polymeric material transitions from a glassy state to a rubbery state. The glassy state is typically associated with a material that is, for example, brittle, stiff, rigid, or combinations thereof. In contrast, the rubbery state is typically associated with a material that is, for example, flexible and elastomeric.

"interpolymerized" refers to monomers that are polymerized together to form a polymer backbone;

"minable" is the ability of a material to be processed on rubber mills and internal mixers;

"monomer" is a molecule which can undergo polymerization which then form part of the essential structure of a polymer;

"perfluorinated" means a group or a compound derived from a hydrocarbon wherein all hydrogen atoms have been replaced by fluorine atoms. A perfluorinated compound may however still contain other atoms than fluorine and carbon atoms, like chlorine atoms, bromine atoms and iodine atoms; and "polymer" refers to a macrostructure comprising interpolymerized units of monomers.

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

The present disclosure relates to a polymer that has good tensile strength and compression set, in particular at elevated temperatures. Additionally, the polymer should be able to be processed similarly to an elastomer, for example by being able to be milled.

The present disclosure is directed toward a fluorinated block copolymer. "Block copolymers" are polymers in which chemically different blocks or sequences are covalently bonded to each other. The fluorinated block copolymers of the present disclosure include at least two different polymeric blocks; referred to as the A block and the B block. The A block and the B block have different chemical compositions and/or different glass transition temperatures.

The A block of the present disclosure is a semi-crystalline segment. If studied under a differential scanning calorimetry (DSC), the block would have at least one melting point temperature ($T_m$) of greater than 70° C. and a measurable enthalpy, for example, greater than 0 J/g (Joules/gram), or even greater than 0.01 J/g. The enthalpy is determined by the area under the curve of the melt transition as measured by DSC using the test disclosed herein and expressed as Joules/gram (J/g).

The A block is copolymer derived from at least the following monomers: tetrafluoroethylene (TFE), hexafluoropropylene (HFP), and vinylidene fluoride (VDF). In one embodiment, the A block comprises 30-85 wt % TFE; 5-40 wt % HFP; and 5-55 wt % VDF; 30-75 wt % TFE; 5-35 wt % HFP; and 5-50 wt % VDF; or even 40-70 wt % TFE; 10-30 wt % HFP; and 10-45 wt % VDF.

Additional monomers may also be incorporated into the A block, such as perfluorovinyl ether and perfluoroallyl ether monomers. Typically these additional monomers are used at percentages of less than 10, 5, or even 1% by weight relative to the other monomers used.

Examples of perfluorovinyl ethers that can be used in the present disclosure include those that correspond to the formula: $CF_2=CF—O—R_f$ wherein $R_f$ represents a perfluorinated aliphatic group that may contain no, one or more oxygen atoms and up to 12, 10, 8, 6 or even 4 carbon atoms. Exemplary perfluorinated vinyl ethers correspond to the formula: $CF_2=CFO(R^a_fO)_n (R^b_fO)_m R^c_f$ wherein $R^a_f$ and $R^b_f$ are different linear or branched perfluoroalkylene groups of 1-6 carbon atoms, in particular 2-6 carbon atoms, m and n are independently 0-10 and $R^c_f$ is a perfluoroalkyl group of 1-6 carbon atoms. Specific examples of perfluorinated vinyl ethers include perfluoro (methyl vinyl) ether (PMVE), perfluoro (ethyl vinyl) ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxy-ethylvinyl ether, $CF_2=CFOCF_2OCF_3$, $CF_2=CFOCF_2OCF_2CF_3$, and $CF_3—(CF_2)_2—O—CF(CF_3)—CF_2—O—CF(CF_3)—CF_2—O—CF=CF_2$.

Examples of perfluoroallyl ethers that can be used in the present disclosure include those that correspond to the formula: $CF_2=CF(CF_2)—O—R_f$ wherein $R_f$ represents a perfluorinated aliphatic group that may contain no, one or more oxygen atoms and up to 10, 8, 6, or even 4 carbon atoms. Specific examples of perfluorinated allyl ethers include: $CF_2=CF_2—CF_2—O—(CF_2)_nF$ wherein n is an integer from 1 to 5, and $CF_2=CF_2—CF_2—O—(CF_2)_x—O—(CF_2)_y—F$ wherein x is an integer from 2 to 5 and y is an integer from 1 to 5. Specific examples of perfluorinated allyl ethers include perfluoro (methyl allyl) ether ($CF_2=CF—CF_2—O—CF_3$), perfluoro (ethyl allyl) ether, perfluoro (n-propyl allyl) ether, perfluoro-2-propoxypropyl allyl ether, perfluoro-3-methoxy-n-propylallyl ether, perfluoro-2-methoxy-ethyl allyl ether, perfluoro-methoxymethyl allyl ether, and $CF_3—(CF_2)_2—O—CF(CF_3)—CF_2—O—CF(CF_3)—CF_2—O—CF_2CF=CF_2$, and combinations thereof.

In one embodiment of the present disclosure, the fluorinated block copolymer comprises: at least one A block polymeric unit, wherein each A block has a glass transition (Tg) temperature of greater than 0° C., 5° C., 10° C., 15° C., or even 20° C.; and less than 100° C., 90° C. 80° C., 70° C., 60° C., or even 50° C. The glass transition of the A block and B block can be difficult to determine in DSC on the polymer gum, therefore, torsion rheology of the cured sample can be used to determine the Tg. In performing torsion rheology on a cured sample using the method described in the Example Section below, two transitions are reported, $T_\alpha$, which is the first transition and is associated with the glass transition of the B block, and $T_\beta$, a second, higher transition, which is associated with the glass transition of the A block.

In one embodiment, the weight average molecular weight of the semi-crystalline segment is at least 1000, 5000, 10000, or even 25000 daltons; and at most 400000, 600000, or even 800000 daltons.

The B block is a copolymer derived from at least the following monomers: hexafluoropropylene (HFP), and vinylidene fluoride (VDF). In one embodiment, the B block comprises 25-65 wt % VDF and 15-60 wt % HFP; or even 35-60 wt % VDF and 25-50 wt % HFP.

Additional monomers may also be incorporated into the B block, such as TFE, perfluorovinyl ether, and perfluoroallyl ether monomers, as described above. Typically these additional monomers are used at percentages of less than 30, 20, 10, 5, or even 1% by weight of the B block.

In one embodiment, the B block of the present disclosure is an amorphous segment, meaning that there is an absence of long-range order (i.e., in long-range order the arrangement and orientation of the macromolecules beyond their nearest neighbors is understood). The amorphous segment has no detectable crystalline character by DSC. If studied under DSC, the B block would have no melting point or melt transitions with an enthalpy more than 2 milliJoules/g by DSC.

In another embodiment, the B block of the present disclosure is semi-crystalline, meaning that the block would have at least one melting point ($T_m$) of greater than 60° C. and a measurable enthalpy, (for example, greater than 2 millijoules/gram) when measured by DSC.

The modulus of the B block is such that it can be processed as an elastomer. In one embodiment, the B block has a modulus at 100° C. as measured at a strain of 1% and a frequency of 1 Hz of less than 2.5, 2.0, 1.5, 1, or even 0.5 MPa.

In the present disclosure, the B block may be polymerized in the presence of an iodo chain transfer agent, and optionally halogenated (i.e., Br, I, or CO cure site monomers, to introduce cure sites into the fluoropolymer, which can then be used in subsequent crosslinking reactions.

Exemplary iodo-chain transfer agent include the formula of Rh, where (i) R is a perfluoroalkyl or chloroperfluoroalkyl group having 3 to 12 carbon atoms; and (ii) x=1 or 2. The iodo-chain transfer agent may be a perfluorinated iodo-compound. Exemplary iodo-perfluoro-compounds include 1,3-diiodoperfluoropropane, 1,4-diiodoperfluorobutane, 1,6-diiodoperfluorohexane, 1,8-diiodoperfluorooctane, 1,10-diiodoperfluorodecane, 1,12-diiodoperfluorododecane, 2-iodo-1,2-dichloro-1,1,2-trifluoroethane, 4-iodo-1,2,4-trichloroperfluorobutane, and mixtures thereof.

In one embodiment, the cure site monomers may be derived from one or more compounds of the formula: (a) $CX_2=CX(Z)$, wherein: (i) X each is independently H or F; and (ii) Z is I, Br, $R_f—U$ wherein U=I or Br and $R_f=$a perfluorinated alkylene group optionally containing O atoms or (b) $Y(CF_2)_qY$, wherein: (i) Y is independently selected from Br, I, or Cl and (ii) q=1-6. In addition, non-fluorinated bromo- or iodo-olefins, e.g., vinyl iodide and allyl iodide, can be used. In some embodiments, the cure site monomers are derived from one or more compounds selected from the group consisting of $CF_2=CFCF_2I$, $ICF_2CF_2CF_2CF_2I$, $CF_2=CFCF_2CF_2I$, $CF_2=CFOCF_2CF_2I$, $CF_2=CFOCF_2CF_2CF_2I$, $CF_2=CFOCF_2CF_2CH_2I$, $CF_2=CFCF_2OCH_2CH_2I$, $CF_2=CFO(CF_2)_3—OCF_2CF_2I$, $CF_2=CFCF_2Br$, $CF_2=CFOCF_2CF_2Br$, $CF_2=CFCl$, $CF_2=CFCF_2Cl$, and combinations thereof.

In one embodiment of the present disclosure, the fluorinated block copolymer comprises: at least one B block polymeric unit, wherein each B block has a Tg temperature of less than 0° C., −10° C., −20° C., or even −30° C. As mentioned above, the glass transition of the A block and B block can be difficult to determine using DSC, therefore torsion rheology on a cured sample can be used to determine the Tg for the specific block.

The Tg of the polymeric blocks (i.e., the A block or B block) may be estimated by use of the Fox equation, based on the Tgs of the constituent monomers and the weight percent thereof. The Fox equation is described in W. R.

Sorenson and T. W. Campbell's text entitled "Preparative Methods of Polymer Chemistry" Interscience, New York (1968) p. 209. Specific values for Tgs of appropriate homopolymers can be obtained from P. Peyser's chapter in polymer handbook, $3^{rd}$ ed., edited by J. Brandrup and E. H. Immergut, Wiley, New York (1989) pages V-209 through VI-227. Alternatively, the Tg of the polymeric blocks may be measured by analyzing a polymer comprising the constituent monomers and weight percent thereof via differential scanning calorimetry (DSC) or dynamic mechanical analysis (DMA)

In one embodiment, the weight average molecular weight of the B block segment is at least 5000, 10000, or even 25000; and at most 400000, 600000, or even 800000.

In the fluorinated block copolymers of the present disclosure, the A block and B block are covalently bonded together. In one embodiment, the A block is directly connected to the B block (in other words, a carbon atom of the A block is covalently bonded to a carbon atom of the B block). In one embodiment, the block copolymers of the present disclosure are a linear block copolymer. The linear block copolymer can be divided into di-block ((A-B) structure), tri-block ((A-B-A) structure), multi-block (-(A-B)$_n$-structure), and combinations thereof. In another embodiment, the block copolymers of the present disclosure may be a branched copolymer, for example a comb-type polymer wherein branches extend from a main polymer chain.

In one embodiment of the present disclosure, the fluorinated block copolymer comprises at least one B block and at least two A blocks, wherein B is a midblock and A is an end block. In another embodiment of the present disclosure, the fluorinated block copolymer comprises at least one A block and at least two B blocks, wherein A is a midblock and B is an end block. The composition of the end blocks does not have to be identical to one another, but preferably they are similar in composition.

In one embodiment, the fluorinated block copolymer consists essentially of at least one A block and at least one B block. In other words, the fluorinated block copolymer comprises only A and B block segments, however, the ends of the polymer chain, where the polymerization was terminated, may comprise a different group (a couple of atoms in size) as a result of the initiator and or chain transfer agent used during the polymerization.

In some embodiments, more than two different blocks are used. In one embodiment, multiple blocks with different weight average molecular weights or multiple blocks with different concentrations of the block polymeric units can be used. In one embodiment, a third block may be used that includes at least one different monomer.

In one embodiment of the present disclosure, the fluorinated block copolymer has a Tg of less than 0, −5, −10, −15, −20, or even −25° C. as determined by DSC as described in the Example Section below.

The fluorinated block copolymer of the present disclosure can be prepared by various known methods as long as the A block and B block are covalently bonded to each other in a blocked or grafted form.

In one embodiment, the B block can be prepared by iodine transfer polymerization as described in U.S. Pat. No. 4,158,678 (Tatemoto et al.). For example, during an emulsion polymerization, a radical initiator and an iodine chain transfer agent are used to generate for example an amorphous polymer latex. The radical polymerization initiator to be used for preparing the amorphous segment may be the same as the initiators known in the art that are used for polymerization of fluorine-containing elastomer. Examples of such an initiator are organic and inorganic peroxides and azo compounds. Typical examples of the initiator are persulfates, peroxy carbonates, peroxy esters, and the like. In one embodiment, ammonium persulfate (APS) is used, either solely, or in combination with a reducing agent like sulfites. Typically, the iodine chain transfer agent is a diiodine compound used from 0.01 to 1% by weight based on the total weight of the amorphous polymer. Exemplary diiodine compounds include: 1,3-diiodoperfluoropropane, 1,4-diiodoperfluorobutane, 1,3-diiodo-2-chloroperfluoropropane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane and 1,2-diiodoethane. For the emulsion polymerization, various emulsifying agents can be used. From the viewpoint of inhibiting a chain transfer reaction against the molecules of emulsifying agent that arises during the polymerization, desirable emulsifying agents are salts of carboxylic acid having a fluorocarbon chain or fluoropolyether chain. In one embodiment, the amount of emulsifying agent is from about 0.05% by weight to about 2% by weight, or even 0.2 to 1.5% by weight based on the added water. The thus-obtained latex comprises an amorphous polymer that has an iodine atom which becomes a starting point of block copolymerization of the semicrystalline segment. To the thus-obtained latex, the monomer composition can be changed and the block copolymerization of the semicrystalline segment onto the amorphous polymer can be carried out.

The fluorinated block copolymer gum may or may not be crosslinked. Crosslinking of the resulting fluorinated block copolymer can be performed using a cure system that is known in the art such as: a peroxide curative, 2,3-dimethyl-2,3-dimethyl-2,3-diphenyl butane, and other radical initiators such as an azo compounds, and other cure systems such as a polyol and polyamine cure systems.

Peroxide curatives include organic or inorganic peroxides. Organic peroxides are preferred, particularly those that do not decompose during dynamic mixing temperatures.

The crosslinking using a peroxide can be performed generally by using an organic peroxide as a crosslinking agent and, if desired, a crosslinking aid including, for example, bisolefins (such as $CH_2$=$CH(CF_2)_6CH$=$CH_2$, and $CH_2$=$CH(CF_2)_8CH$=$CH_2$), diallyl ether of glycerin, triallylphosphoric acid, diallyl adipate, diallylmelamine and triallyl isocyanurate (TAIC), fluorinated TAIC comprising a fluorinated olefinic bond, tri(methyl)allyl isocyanurate (TMAIC), tri(methyl)allyl cyanurate, poly-triallyl isocyanurate (poly-TAIC), xylylene-bis(diallyl isocyanurate) (XBD), and N,N'-m-phenylene bismaleimide.

Examples of the organic peroxide include benzoyl peroxide, dicumyl peroxide, di-tert-butyl peroxide, 2,5-dimethyl-2,5-di-tert-butylperoxyhexane, 2,4-dichlorobenzoyl peroxide, 1,1-bis(tert-butylperoxy)-3,3,5-trimethylchlorohexane, tert-butyl peroxy isopropylcarbonate (TBIC), tert-butyl peroxy 2-ethylhexyl carbonate (TBEC), tert-amyl peroxy 2-ethylhexyl carbonate, tert-hexylperoxy isopropyl carbonate, carbonoperoxoic acid, O,O'-1,3-propanediyl OO,OO'-bis(1,1-dimethylethyl) ester, tert-butylperoxy benzoate, t-hexyl peroxy-2-ethylhexanoate, t-butyl peroxy-2-ethylhexanoate, di(4-methylbenzoyl) peroxide, laurel peroxide and cyclohexanone peroxide. Other suitable peroxide curatives are listed in U.S. Pat. No. 5,225,504 (Tatsu et al.). The amount of peroxide curing agent used generally will be 0.1 to 5, preferably 1 to 3 parts by weight per 100 parts of fluorinated block copolymer. Other conventional radical initiators are suitable for use with the present disclosure.

Examples of azo compounds useful in curing the fluorinated block copolymers of the present disclosure are those that have a high decomposition temperature. In other words, they decompose above the upper use temperature of the resulting product. Such azo compounds may be found for example in "Polymeric Materials Enciclopedia, by J. C. Salamone, ed., CRC Press Inc., New York, (1996) Vol. 1, page 432-440.

The crosslinking using a polyol is performed generally by using a polyol compound as a crosslinking agent, a crosslinking aid such as ammonium salt, phosphonium salt and iminium salt, and a hydroxide or oxide of a divalent metal such as magnesium, calcium, or zinc. Examples of the polyol compound include bisphenol AF, bisphenol A, bisphenol S, dihydroxybenzophenone, hydroquinone, 2,4,6-trimercapto-S-triazine, 4,4'-thiodiphenol, and a metal salt thereof.

The crosslinking using a polyamine is performed generally by using a polyamine compound as a crosslinking agent, and an oxide of a divalent metal such as magnesium, calcium, or zinc. Examples of the polyamine compound or the precursor of the polyamine compound include hexamethylenediamine and a carbamate thereof, 4,4'-bis(aminocyclohexyl)methane and a carbamate thereof, and N,N'-dicinnamylidene-1,6-hexamethylenediamine.

The crosslinking agent (and crosslinking aid, if used) each may be used in a conventionally known amount, and the amount used can be appropriately determined by one skilled in the art. The amount used of each of these components participating in the crosslinking may be, for example, about 1 part by mass or more, about 5 parts by mass or more, about 10 parts by mass or more, or about 15 parts by mass or more, and about 60 parts by mass or less, about 40 parts by mass or less, about 30 parts by mass or less, or about 20 parts by mass or less, per 100 parts by mass of the fluorinated block copolymer. The total amount of the components participating in the crosslinking may be, for example, about 1 part by mass or more, about 5 parts by mass or more, or about 10 parts by mass or more, and about 60 parts by mass or less, about 40 parts by mass or less, or about 30 parts by mass or less, per 100 parts by mass of the fluorinated block copolymer.

For the purpose of, for example, enhancing the strength or imparting the functionality, conventional adjuvants, such as, for example, acid acceptors, fillers, process aids, or colorants may be added to the composition.

For example, acid acceptors may be used to facilitate the cure and thermal stability of the composition. Suitable acid acceptors may include magnesium oxide, lead oxide, calcium oxide, calcium hydroxide, dibasic lead phosphite, zinc oxide, barium carbonate, strontium hydroxide, calcium carbonate, hydrotalcite, alkali stearates, magnesium oxalate, or combinations thereof. The acid acceptors are preferably used in amount raging from about 1 to about 20 parts per 100 parts by weight of the fluorinated block copolymer.

Fillers include: an organic or inorganic filler such as clay, silica ($SiO_2$), alumina, iron red, talc, diatomaceous earth, barium sulfate, wollastonite ($CaSiO_3$), calcium carbonate ($CaCO_3$), calcium fluoride, titanium oxide, iron oxide and carbon black fillers, a polytetrafluoroethylene powder, PFA (TFE/perfluorovinyl ether copolymer) powder, an electrically conductive filler, a heat-dissipating filler, and the like may be added as an optional component to the composition. Those skilled in the art are capable of selecting specific fillers at required amounts to achieve desired physical characteristics in the vulcanized compound. The filler components may result in a compound that is capable of retaining a preferred elasticity and physical tensile, as indicated by an elongation and tensile strength value, while retaining desired properties such as retraction at lower temperature (TR-10). In one embodiment, the composition comprises less than 40, 30, 20, 15, or even 10% by weight of the filler.

The fluorinated block copolymer composition is mixed with the curing agent and optional conventional adjuvants. The method for mixing include, for example, kneading with use of a twin roll for rubber, a pressure kneader or a Banbury mixer.

The mixture may then be processed and shaped such as by extrusion or molding to form an article of various shapes such as sheet, a hose, a hose lining, an o-ring, a gasket, a packer, or a seal composed of the composition of the present disclosure. The shaped article may then be heated to cure the gum composition and form a cured elastomeric article.

Pressing of the compounded mixture (i.e., press cure) is typically conducted at a temperature of about 120-220° C., or even about 140-200° C., for a period of about 1 minute to about 15 hours, usually for about 1-15 minutes. A pressure of about 700-20,000 kPa (kiloPascals), or even about 3400-6800 kPa, is typically used in molding the composition. The molds first may be coated with a release agent and prebaked.

The molded vulcanizate can be post cured in an oven at a temperature of about 140-240° C., or even at a temperature of about 160-230° C., for a period of about 1-24 hours or more, depending on the cross-sectional thickness of the sample. For thick sections, the temperature during the post cure is usually raised gradually from the lower limit of the range to the desired maximum temperature. The maximum temperature used is preferably about 260° C., and is held at this value for about 1 hour or more.

Fluorinated block copolymers of the present disclosure may be used in articles, such as a hose, a seal (e.g., a gasket, an o-ring, a packer element, a blow-out preventor, a valve, etc.), a stator, or a sheet. These compositions may or may not be post cured.

By taking advantage of the high tensile and high modulus afforded by the A block, a fluorinated block copolymer having good toughness (e.g., high tensile strength) and good compression set can be achieved.

The fluorinated block copolymer of the present disclosure balances the toughness imparted by the A block with the viscosity (and optional flexibility) imparted by the B block. This balancing of the A block and B block generates a fluorinated block copolymer that can be processed as a traditional elastomer, for example a polymer that can be processed with a two-roll mill or an internal mixer. Mill blending is a process that rubber manufacturers use to combine the polymer gum with the requisite curing agents and/or additives. In order to be mill blended, the curable composition must have a sufficient modulus. In other words, not too soft that it sticks to the mill, and not too stiff that it cannot be banded onto mill. The fluorinated block copolymer of the present disclosure has a modulus of at least 0.1, 0.3, or even 0.5 MPa (megaPascals); and at most 2.5, 2.2, or even 2.0 MPa at 100° C. as measured at a strain of 1% and a frequency of 1 Hz (Hertz). The amount of the A block to B block used in the fluorinated block copolymer can vary based on the properties of the individual polymeric segments. For example, if the A block has a high degree of crystallinity, then less overall A block is used in the fluorinated block copolymer. Thus, the storage modulus is a property that can be used to take into account using less of a semicrystalline segment with a high degree of crystallinity in the block copolymer versus more of a semicrystalline segment with a lower degree of crystallinity. By adding more A block into the fluorinated block copolymer, better tensile is obtained and the polymer retains the properties at high temperatures. However, too much A block and the composition is unable to be processed as an elastomer and the stress at 100% strain (100% modulus) suffers.

In one embodiment, the fluorinated block copolymer of the present disclosure has a melting point of at least 100, 110, 150, or even 175° C.; and at most 275, 250, or even 200° C. It is believed that the melting point of the fluorinated block copolymer is based on the melting point of the semicrystalline segment since amorphous polymer does not have a melting point. In one embodiment, the melting point of the block copolymer is greater than the upper use temperature of the resulting article to maximize the reinforcement effect of the A block.

In one embodiment, the fluorinated block copolymer of the present disclosure has a Tg of greater than −40, −30, or even −20° C.; and at most 15, 10, 0, or even −5° C. as measured by DSC as described in the Example Section below. Both the A block and the B block will have a Tg. In general, the Tg of the B block is believed to be responsible for the Tg of the reported block copolymer.

Depending on the method of making the fluorinated block copolymer and/or the cure site monomers and/or the chain transfer agent used, the fluorinated block copolymer may comprise iodine. In one embodiment, the fluorinated block copolymer comprises at least 0.05, 0.1, or even 0.2 wt %; and at most 1, 0.8, or even 0.5 wt % of iodine based on the weight of the fluorinated block copolymer.

The fluorinated block copolymers of the present disclosure may have a weight average molecular weight (Mw) of at least 50,000 dalton, at least 100,000 dalton, at least 300,000 dalton, at least 500,000 dalton, at least, 750,000 dalton, at least 1,000,000 dalton, or even at least 1,500,000 dalton and not such a high molecular weight as to cause premature gelling of the fluorinated block copolymer.

The fluorinated block copolymers of the present disclosure, wherein the A block and B block are covalently bonded together, have improved properties over the mixture of the two individual polymers, for example higher tensile strength and improved compression set.

The fluorinated block copolymers of the present disclosure have been found to have good tensile strength, and 100% modulus. Surprisingly, it has also been discovered that the fluorinated block copolymer of the present disclosure has good compression set. Compression set is the deformation of the polymer remaining once a force is removed. Generally, lower compression set values are better (i.e., less deformation of the material). Typically, plastics (comprising a semicrystalline morphology) do not have good compression set. Therefore, it was surprising that the fluorinated block copolymer comprising the semicrystalline segment has good compression set. It was also surprising that the fluorinated block copolymers of the present disclosure retained their properties at elevated temperatures.

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Mo., or may be synthesized by conventional methods.

These abbreviations are used in the following examples: phr=parts per hundred rubber; rpm=revolutions per minute; mg=milligrams; g=grams; in =inch; kg=kilograms; L=liters; min=minutes; hr=hour; ° C.=degrees Celsius; psig=pounds per square inch gauge; MPa=megapascals; Hz=Hertz; wt=weight; wt %=percent by weight; and dNm=deci Newton-meter.

Methods

Melting Point and Glass Transition Temperatures

Melting point ($T_m$) and glass transition temperature ($T_g$) were determined by a differential scanning calorimetry (DSC, Q2000 by TA Instruments, New Castle, Del.) under a nitrogen flow. The sample size was 5 mg±0.25 mg. A DSC thermogram was obtained from the second heat of a heat/cool/heat cycle. The first heat cycle started at −85° C. and was ramped at a rate of 10° C./min up to a final temperature, wherein the final temperature was selected to be 50-100° C. above the expected melt temperature. The cooling cycle started at the final temperature from the first heat cycle and was cooled to −85° C. at 10° C./min. The second heat cycle started at −85° C. and was ramped at a rate of 10° C./min back up to a final temperature.

Enthalpy

Using the DSC thermogram from the second heat cycle (taken above in the Melting Point and Glass Transition Temperature method) and the TA instruments Universal Analysis software, the enthalpy was determined by integrating the beginning and the end of the melting point.

Percent Iodine

Uncured polymer samples were homogenized on a 2 roll mill to a thickness of approximately 12 mm. The samples were then die cut using a 40 mm diameter punch, and loaded into stainless steel sample cups. The samples were analysed for iodine by X-ray fluorescence using an instrument available under the trade designation "Supermini200 WDXRF" from Rigaku Corporation, The Woodlands, Tex., operated in "quick scan" mode using software available under the trade designation "ZSX" available from Rigaku Corporation.

Transitions $T_\alpha$ and $T_\beta$ $T_\alpha$ and $T_\beta$ were measured by a rheometer ("AR-2000ex" from TA Instruments, New Castle, Del.) equipped with an environmental testing chamber and operated in torsion mode. Samples of post cured fluoropolymers, all with approximate dimensions of 2 mm thickness, 6 mm width, and 25 mm length, were tested at 1 Hz and 1% strain with a temperature ramp from −65° C. to 150° C. at a ramp of 5° C./min. Using data analysis software (Rheology advantage from TA Instruments), $T_\alpha$, and $T_\beta$ were measured as local maxima in Tan δ, the ratio of storage modulus to loss modulus.

Modulus

Modulus at 100° C. was determined using a rheometer (RPA 2000 by Alpha technologies, Akron, Ohio) at a strain of 1% and a frequency of 1 Hz from the storage modulus, which is obtained from ASTM 6204-07.

Cure Rheology

Cure rheology tests were carried out using uncured, compounded samples using a rheometer (PPA 2000 by Alpha technologies, Akron, Ohio), in accordance with ASTM D 5289-93a at 177° C., no pre-heat, 12 minute elapsed time, and a 0.5 degree arc. Both the minimum torque ($M_L$) and highest torque attained during a specified period of time when no plateau or maximum torque ($M_H$) was obtained were measured. Also measured were the time for the torque to increase 2 units above $M_L$ ($t_s2$), the time for the torque to reach a value equal to $M_L+0.1(M_H-M_L)$, (t'10), the time for the torque to reach a value equal to $M_L+0.5(M_H-M_L)$, (t'50), and the time for the torque to reach $M_L+0.9(M_H-M_L)$, (t'90). Results are reported in Tables 2.

Physical Properties

O-rings having a cross-section thickness of 0.139 inch (3.5 mm) and sheets having a thickness of 2.0 mm were molded using the uncured compounded sample and press cured, followed by a postcure as noted in the table below. The dumbbell specimens were cutout from the sheets and subjected to physical property testing similar to the procedure disclosed in ASTM D412-06a (2013). The O-rings were subjected to compression set testing similar to the procedure disclosed in ASTM 395-89 method B, with 25% initial deflection. Results are reported in Table 2.

Physical Properties measured at 150° C.

Dumbbell specimens were cutout from the sheets and subjected to physical property testing similar to the procedure disclosed in ASTM D412-06a (2013). The tensile, elongation and 100% modulus were measured on a tensometer (available from MTS Systems Corp., Eden Prairie, Minn.) equipped with an environmental chamber. Samples were placed into an oven and the temperature was allowed to equilibrate (within 1° C. of set point temperature, which was 150° C.). Once the temperature was equilibrated the sample was soaked for 3 minutes after which the testing was initiated. Because the tensometer did not comprise an extensometer, the elongation was calculated by a crosshead extension.

Materials Table

| Name | Source |
| --- | --- |
| 1,4-diiodooctafluorobutane | Commercially available from Tosoh Corp., Grove City, OH. |
| Emulsifier | An aqueous solution comprising 30% by weight of $CF_3OCF_2CF_2CF_2OCHFCF_2CO_2NH_4$ and spiked with a 1.5% wt of a fluorinated liquid commercially available under the trade designation "FLUORINERT FC-70" from 3M Co., St. Paul, MN. $CF_3OCF_2CF_2CF_2OCHFCF_2CO_2NH_4$ is the ammonium salt of the compound prepared as in "Preparation of Compound 11" in U.S. Pat. No. 7,671,112 |
| Carbon Black | N990 Carbon black commercially available from Cancarb Ltd, Medicine Hat, Alta., Canada |
| Coagent | Triallyl-isocyanurate commercially available under the trade designation "TAIC" from Nippon Kasei Chemical Co. Ltd., Tokyo, Japan |
| Peroxide | 2,5-dimethyl-2,5-di(t-butylperoxy)-hexane, 50% active, available under the trade designation "VAROX DBPH-50" from Vanderbilt Chemicals, LLC., Norwalk, CT. |

Polymer 1

B block: A 40 L reactor was charged with 22500 g of deionized water and heated to 80° C. The agitator rate was then brought to 350 rpm, followed by additions of 40 g of potassium phosphate, 140 g of 1,4-diiodooctafluorobutane, and 20 g of ammonium persulfate. Immediately following this addition, the vacuum was broken with HFP to 40 psig (0.38 MPa). Then, the reactor was pressured up with a HFP/VDF wt ratio of 0.88 and a TFE/VDF wt ratio of 1.0 until the reactor reached a pressure of 220 psig (1.52 MPa). Once at pressure, monomer weight ratios were changed to HFP/VDF of 1.24 and TFE/VDF of 0.73. An additional 2500 g of deionized water was added during the processing to dissolve solid reagents and for rinsing after delivery of the reagents. The reaction was run until 24.9% solids, stopped, and the latex was drained from the reactor.

A block: A 40 L reactor was charged with 11000 g of deionized water and 16.5 kg of the latex comprising the B block described above. The reactor was then brought to 60° C. With the reactor at temperature, the agitator rate was set at 350 rpm, followed by addition of 330 g of Emulsifier, with the vacuum being broken with nitrogen. The reactor was brought up to a pressure of 15 psig (0.10 MPa) with TFE, then to 133 psig (0.92 MPa) with HFP, then to 145 psig (1.00 MPa) with VDF, and finally to 232 psig (1.60 MPA) with TFE. The monomer ratios were then set at a HFP/VDF wt ratio of 0.768 and a TFE/VDF wt ratio of 8.068. An additional 1000 g of deionized water was added during the processing to dissolve solid reagents and for rinsing after delivery of the reagents. The reaction was run until 25% solids. The latex was then coagulated using a 1.25% magnesium chloride solution in deionized water, and oven dried at 130° C. for 16 hrs.

The resulting fluorinated block copolymer had a Tg of −11° C., and a $T_m$ determined by DSC of 252° C. The theoretical ratio of the B block to the A block was 50:50.

Polymer 2

The B block was prepared under the same conditions as the B block in Polymer 1 with the exception that the reaction was run to 25.1% solids.

A block: A 40 L reactor was charged with 7000 g of deionized water and 48 lb (21.8 kg) of the B block latex. The reactor was then brought to 60° C. With the reactor at temperature, the agitator rate was set at 350 rpm, followed by addition of 330 g of Emulsifier, with the vacuum being broken with nitrogen. The reactor was brought up to a pressure of 15 psig (0.10 MPa) with TFE, then to 133 psig (0.92 MPa) with HFP, then to 145 psig (1.00 MPa) with VDF, and finally to 232 psig (1.60 MPa) with TFE. The monomer ratios were then set at a HFP/VDF wt ratio of 0.768 and a TFE/VDF wt ratio of 8.068. An additional 1000 g of deionized water was added during the processing to dissolve solid reagents and for rinsing after delivery of the reagents. The reaction was run until 25% solids. The latex was then coagulated using a 1.25% magnesium chloride solution in deionized water, and oven dried at 130° C. for 32 hrs.

The resulting fluorinated block copolymer had a Tg of −11° C., and a Tm determined by DSC of 249° C. The theoretical ratio of the B block to the A block was 65:35.

Polymer 3

The B block was prepared under the same conditions as the B block in Polymer 1 with the exception that the reaction was run to 24.6% solids.

A block: A 40 L reactor was charged with 3000 g of deionized water and 27.0 kg of the B block latex. The reactor was then brought to 60° C. with the reactor at temperature, the agitator rate was set at 350 rpm, followed by addition of 330 g of Emulsifier, with the vacuum being broken with nitrogen. The reactor was brought up to a pressure of 15 psig (0.10 MPa) with TFE, then to 133 psig (0.92 MPa) with HFP, then to 145 psig (1.00 MPa) with VDF, and finally to 232 psig (1.60 MPa) with TFE. The monomer ratios were then set at a HFP/VDF wt ratio of 0.768 and a TFE/VDF wt ratio of 8.068. An additional 1000 g of deionized water was added during the processing to dissolve solid reagents and for rinsing after delivery of the reagents. The reaction was run until 25% solids. The latex was then coagulated using a 1.25% magnesium chloride solution in deionized water, and oven dried at 130° C. for 32 hrs.

The resulting fluorinated block copolymer had a Tg of −11° C., and a $T_m$ determined by DSC of 248° C. The theoretical ratio of the B block to the A block was 80:20.

Polymer 4

The B block was prepared under the same conditions as the B block in Polymer 1 with the exception that the reaction was run to 24.9% solids.

A block: A 40 L reactor was charged with 11000 g of deionized water and 16.5 kg of the B block latex. The reactor was then brought to 71° C., the agitator rate was set at 350 rpm, followed by addition of 330 g of Emulsifier. Vacuum was broken on the reactor with HFP to a pressure of 25 psig (0.17 MPa), followed by bringing the reactor to a pressure of 220 psig (1.52 MPa) using a HFP/VDF wt ratio of 7.45 and a TFE/VDF wt ratio of 2.67. Once at pressure, the reaction was carried out at a HFP/VDF wt ratio of 0.82 and a TFE/VDF wt ratio of 2.73 until 25% solids. An additional 1000 grams of deionized water was added during the processing to dissolve solid reagents and for rinsing after delivery of the reagents. The latex was then coagulated using a 1.25% magnesium chloride solution in deionized water, and oven dried at 130° C. for 16 hrs.

The resulting fluorinated block copolymer had a Tg of −10° C., and a Tm determined by DSC of 167° C. The theoretical ratio of the B block to the A block was 50:50.

Polymer 5

The B block was prepared under the same conditions as the B block in Polymer 1 with the exception that the reaction was run to 25.5% solids.

A block: A 40 L reactor was charged with 11000 grams of deionized water and 15.9 kg of the B block latex. The reactor was then brought to 71° C. the agitator rate was set at 350 rpm, followed by addition of 330 grams of Emulsifier. Vacuum was broken on the reactor with HFP to a pressure of 25 psig (0.17 MPa), followed by bringing the reactor to a pressure of 220 psig (1.52 MPa) using a HFP/VDF wt ratio of 2.56 and a TFE/VDF wt ratio of 0.84. Once at pressure, the reaction was carried out at a HFP/VDF wt ratio of 0.52 and a TFE/VDF wt ratio of 1.22 until 25% solids. An additional 1000 grams of deionized water was added during the processing to dissolve solid reagents and for rinsing after delivery of the reagents. The latex was then coagulated using a 1.25% magnesium chloride solution in deionized water, and oven dried at 130° C. for 16 hrs.

The resulting fluorinated block copolymer had a Tg of −7° C., and a $T_m$ determined by DSC of 118° C. The theoretical ratio of the B block to the A block was 50:50.

Polymer 6

Polymer 6 is a mill blend of two fluoropolymers.

The first fluoropolymer was prepared identically to the B block in Polymer 1 with the exception that the reaction was run to 23.54% solids.

The second fluoropolymer was in a pelletized form comprising a TFE/VDF wt ratio of 1.10 and a HFP/VDF wt ratio of 0.52. This semicrystalline fluoropolymer has a $T_m$ of 117° C.

200 g of the semi crystalline fluoropolymer pellets were passed through a two roll mill until a thin film was formed, which was subsequently cut into strips approximately 50 mm wide by 125 mm long. The first fluoropolymer was banded onto the mill, followed by addition of a semi crystalline fluoropolymer strip, and blended into the elastomeric fluoropolymer. This process was repeated with the remaining strips.

The resulting fluoropolymer blend comprised a ratio of the first fluoropolymer to the second (semicrystalline) polymer of 50:50. The composition of this blended copolymer would be similar to that of Polymer 5, which is a block copolymer.

Polymer 7

Polymer 7 is a semicrystalline fluoropolymer with a TFE/VDF wt ratio of 0.707 and a HFP/VDF wt ratio of 0.224.

Polymer 8

Polymer 8 is a semicrystalline fluoropolymer with a TFE/VDF wt ratio of 1.746 and a HFP/VDF wt ratio of 0.350.

Polymer 9

The fluoropolymer was prepared identically to the B block in Polymer 1. This fluoropolymer was used as Polymer 9.

Polymer 10

B block: A 40 L reactor was charged with 22500 grams of deionized water and heated to 80° C. The agitator rate was then brought to 350 rpm, followed by additions of 40 g of potassium phosphate, 140 g of 1,4-diiodooctafluorobutane, 330 g of Emulsifier, and 20 g of ammonium persulfate. Immediately following this addition, the vacuum was broken with HFP to 0.38 MPa. Then, the reactor was pressured up with a HFP/VDF wt ratio of 0.65 and a TFE/VDF wt ratio of 0.09 until the reactor reached a pressure of 220 psig (1.52 MPa). Once at pressure, monomer weight ratios were changed to HFP/VDF of 0.49 and TFE/VDF of 0.15. An additional 2500 g of deionized water was added during the processing to dissolve solid reagents and for rinsing after delivery of the reagents. The reaction was run until 26.6% solids, stopped, and the latex was drained from the reactor.

A block: A 40 L reactor was charged with 11000 g of deionized water and 26.3 kg of the latex comprising the B block described above. The reactor was then brought to 60° C. The reactor was brought up to a pressure of 15 psig (0.10 MPa) with TFE, then to 133 psig (0.92 MPa) with HFP, then to 145 psig (1.00 MPa) with VDF, and finally to 232 psig (1.60 MPA) with TFE. The monomer ratios were then set at a HFP/VDF wt ratio of 0.768 and a TFE/VDF wt ratio of 8.068. An additional 1000 g of deionized water was added during the processing to dissolve solid reagents and for rinsing after delivery of the reagents. The reaction was run until 25% solids. The latex was then coagulated using a 1.25% magnesium chloride solution in deionized water, and oven dried at 130° C. for 16 hrs.

The resulting fluorinated block copolymer had a Tg of −27° C., and a $T_m$ determined by DSC of 257° C. The theoretical ratio of the B block to the A block was 80:20.

A summary of the Tg, Tm, Modulus at 100° C., Enthalpy, and Percent Iodine for the various polymers measured using the test methods described above is shown in Table 1 below.

TABLE 1

| Polymer | 1 | 2 | 3 | 4 | 5 | 6 | 7 | 8 | 9 | 10 |
|---|---|---|---|---|---|---|---|---|---|---|
| $T_g$ (° C.) | −11 | −11 | −11 | −10 | −7 | −11 | 2 | 24 | −11 | −27 |
| $T_m$ (° C.) | 252 | 249 | 247 | 167 | 119 | 119 | 118 | 166 | 88 | 257 |
| Modulus at 100° C. (MPa) | 2.76 | 0.73 | 0.33 | 1.80 | 1.12 | 0.29 | 1.93 | 3.89 | 0.001 | 1.01 |

TABLE 1-continued

| Polymer | 1 | 2 | 3 | 4 | 5 | 6 | 7 | 8 | 9 | 10 |
|---|---|---|---|---|---|---|---|---|---|---|
| Enthalpy (J/g) | 9.00 | 6.43 | 4.13 | 2.42 | 4.26 | 1.80 | 5.53 | 4.54 | 2.1 | 5.158 |
| Percent Iodine | 0.166 | 0.382 | 0.424 | 0.097 | 0.162 | NT | NT | NT | 0.564 | 0.488 |

NT = Not tested.
Polymers 7, and 8 comprise neither an iodo cure site monomer nor an iodo chain transfer agent.

Examples 1-5 (Ex 1-Ex 5) and Comparative Examples A-D (CE A-CE D)

Except for Polymer 8, whose modulus was too high to be processed further, each of the polymers described above were individually compounded on a two-roll mill as follows: 100 parts of the polymer, 30 phr of Carbon Black, 3 phr Coagent, and 2 phr Peroxide. The compounded polymers were tested as per "Transitions $T_\alpha$ and $T_\beta$", "Cure Rheology" and "Physical Properties" as described above and the results are reported in Table 2. CE C was not tested for Physical Properties because it did not show sufficient cure properties.

The Physical Properties of Ex 1-5 and CE A, CE B, and CE D were also tested at 150° C. and the results are shown in Table 2 as well.

compared to the blend. For Ex 4 and CE B only one transition ($T_\alpha$ and $T_\beta$) was observed, which was broad in nature and is suspected to comprise the glass transition temperature for both Polymer A and Polymer B. CE C and CED comprise a single fluoropolymer segment, thus only one glass transition was observed.

Foreseeable modifications and alterations of this invention will be apparent to those skilled in the art without departing from the scope and spirit of this invention. This invention should not be restricted to the embodiments that are set forth in this application for illustrative purposes. To the extent that there is any conflict or discrepancy between this specification as written and the disclosure in any document mentioned or incorporated by reference herein, this specification as written will prevail.

TABLE 2

| | CE A | Ex 1 | Ex 2 | Ex 3 | Ex 4 | CE B | CE C | CE D | Ex 5 |
|---|---|---|---|---|---|---|---|---|---|
| Polymer Used | 1 | 2 | 3 | 4 | 5 | 6 | 7 | 9 | 10 |
| $T_\alpha$ (° C.) | −5 | −5 | −3 | 2 | 4 | 4 | 10 | 2 | −11 |
| $T_\beta$ (° C.) | 85 | 73 | 77 | 25 | | | | | 65 |
| Cure Rheology | | | | | | | | | |
| $M_L$, dNm | 13.5 | 5.8 | 2.4 | 1.0 | 0.2 | 0.2 | 2.1 | 0 | 3.4 |
| $M_H$, dNm | 81.1 | 59.8 | 47.3 | 35.6 | 34.6 | 17.5 | 4.1 | 25.2 | 41.5 |
| Δ torque | 67.6 | 54.0 | 44.8 | 34.6 | 34.4 | 17.3 | 1.9 | 25.2 | 38 |
| $t_s2$, min | 0.2 | 0.4 | 0.4 | 0.4 | 0.4 | 0.4 | NA | 0.5 | 0.4 |
| t'50, min | 0.6 | 0.8 | 0.8 | 0.7 | 0.8 | 0.8 | 0.9 | 0.8 | 0.8 |
| t'90, min | 1.2 | 1.5 | 1.5 | 1.2 | 1.5 | 1.5 | 1.5 | 1.7 | 1.5 |
| tan δ $M_L$ | 1.35 | 0.52 | 1.43 | 0.98 | 1.43 | 1.43 | 1.5 | 0.0 | 1.43 |
| tan δ $M_H$ | 0.267 | 0.059 | 0.073 | 0.057 | 0.073 | 0.073 | 0.97 | 0.068 | 0.73 |
| Physical Properties: Press Cure 10 mins @177° C., Post Cure 4 hrs at 232° C. | | | | | | | | | |
| Tensile Strength (MPa) | 18 | 31 | 31 | 28 | 29 | 15 | NT | 19 | 29 |
| Elongation @ break % | 43 | 143 | 165 | 184 | 143 | 230 | NT | 176 | 160 |
| Stress at 100% Strain (MPa) | NA | 21 | 17 | 15 | 12 | 13 | NT | 8 | 22 |
| Hardness, Shore A ASTM D2240 | 84 | 94 | 91 | 83 | 94 | 92 | NT | 81 | 91 |
| Compression set % (70 hrs @200° C.) | NA | 48 | 44 | 27 | 33 | 63 | NT | 41 | 37 |
| Physical Properties measured at 150° C.: Press Cure 10 mins @177° C., Post Cure 4 hrs at 232° C. | | | | | | | | | |
| Tensile Strength (MPa) | 6 | 9 | 8 | 7 | 5 | 1 | NT | 4 | 8 |
| Elongation @ break % | 61 | 161 | 166 | 201 | 202 | 52 | NT | 121 | 123 |
| Stress at 100% Strain (MPa) | NA | 5 | 4 | 3 | 2 | NA | NT | 3 | 7 |

In the Table 2, NA means not applicable. For example in CE A, because of the difficulty in processing, no O-rings were made, so compression set was not tested. Additionally the polymer failed prior to 100% strain, so the 100% modulus (Stress at 100% strain) was unavailable. CE B was made to be similar in composition to Ex 4, except it was a polymer blend instead of a block copolymer. As shown in Table 2, the polymer blend has similar 100% Modulus (stress at 100% strain) as the block copolymer, but the block copolymer has improved tensile, improved compression set and better retention of properties at elevated temperatures as

What is claimed is:

1. A curable composition comprising:
   a millable fluorinated block copolymer comprising at least one A block and at least one B block,
     wherein the A block is a semi-crystalline segment comprising interpolymerized monomers,
     wherein the monomers comprise TFE, HFP and VDF;
     wherein the B block is a segment comprising interpolymerized monomers,
     wherein the monomers comprise HFP and VDF; and wherein the millable fluorinated block copolymer has a modulus of 0.1 to 2.5 MPa at 100° C.

2. The curable composition of claim 1, wherein the fluorinated block copolymer has a melting point of at least 100 and at most 275° C.

3. The curable composition of claim 1, wherein the B block is semi-crystalline.

4. The curable composition of claim 1, wherein the B block is amorphous.

5. The curable composition of claim 1, wherein the Tg of the A block is greater than 0° C. and less 80° C.

6. The curable composition of claim 1, wherein the Tg of the B block is less than 0° C.

7. The curable composition of claim 1, wherein the A block further comprises a monomer selected from the group consisting of a perfluorovinyl ether monomer, and a perfluoroallyl ether monomer.

8. The curable composition of claim 7, wherein the perfluoroallyl ether monomer is selected from the group consisting of: perfluoro (methyl allyl) ether ($CF_2$=CF—$CF_2$—O—$CF_3$), perfluoro (ethyl allyl) ether, perfluoro (n-propyl allyl) ether, perfluoro-2-propoxypropyl allyl ether, perfluoro-3-methoxy-n-propylallyl ether, perfluoro-2-methoxy-ethyl allyl ether, perfluoro-methoxy-methyl allyl ether, and $CF_3$—$(CF_2)_2$—O—$CF(CF_3)$—$CF_2$—O—$CF(CF_3)$—$CF_2$—O—$CF_2CF$=$CF_2$.

9. The curable composition of claim 1, wherein the B block further comprises a monomer selected from the group consisting of TFE, a cure site monomer, a perfluorovinyl ether monomer, and a perfluoroallyl ether monomer.

10. The curable composition of claim 1, wherein the millable fluorinated block copolymer comprises about 0.05 wt % to about 1 wt % of iodine based on the weight of the millable fluorinated block copolymer.

11. The curable composition of claim 1, further comprising a peroxide cure system.

12. A cured article comprising a reaction product of components, wherein at least one of the components comprises the curable composition of claim 1.

13. The cured article of claim 12, wherein the article is a packer, an o-ring, a seal, a gasket, a hose, or a sheet.

14. The curable composition of claim 1, wherein the glass transition temperature of the millable fluorinated block copolymer is less than −20° C.

15. The curable composition of claim 1, wherein the A block comprises 30-85 wt % TFE; 5-40 wt % HFP; and 5-55 wt % VDF.

16. The curable composition of claim 15, wherein the A block further comprises an additional monomer, wherein the additional monomer is less than 10% by weight of the A block.

17. The curable composition of claim 1, wherein the B block comprises 25-65 wt % VDF and 15-60 wt % HFP.

18. The curable composition of claim 17, wherein the B block further comprises an additional monomer, wherein the additional monomer is less than 20% by weight of the B block.

19. The curable composition of claim 1, wherein the A block comprises 40-70 wt % TFE; 10-30 wt % HFP; and 10-45 wt % VDF.

20. The curable composition of claim 1, wherein the B block comprises 35-60 wt % VDF and 25-50 wt % HFP.

* * * * *